United States Patent [19]
Fuisz

[11] 3,918,433
[45] Nov. 11, 1975

[54] FLUID SAMPLING DEVICE

[76] Inventor: Richard C. Fuisz, R.D. 1, Bethlehem, Pa. 18017

[22] Filed: May 22, 1974

[21] Appl. No.: 472,290

[52] U.S. Cl. .............. 128/2 F; 128/295; 128/284; 128/288
[51] Int. Cl.² ............. A61B 5/10; A61F 13/00
[58] Field of Search ........... 128/283, 2 F, 288, 284, 128/287, 132 D, 286, 290 R, 295; 23/230, 253 TP; 252/408

[56] References Cited
UNITED STATES PATENTS

| | | | |
|---|---|---|---|
| 1,054,619 | 2/1913 | Robey | 128/286 |
| 2,277,043 | 3/1942 | Cohn | 128/284 |
| 2,711,736 | 6/1955 | Petitpas | 128/286 |
| 2,952,260 | 9/1960 | Burgeni | 128/290 R |
| 3,212,500 | 10/1965 | Bardy | 128/295 |
| 3,430,629 | 3/1969 | Murphy | 128/284 |
| 3,452,750 | 7/1969 | Blanford | 128/132 D |
| 3,459,174 | 8/1969 | Walker | 128/2 F |
| 3,650,267 | 3/1972 | Anderson | 128/132 D |
| 3,660,003 | 5/1972 | Schwartz | 128/2 F |

Primary Examiner—Aldrich F. Medbery
Attorney, Agent, or Firm—Watson Leavenworth Kelton & Taggart

[57] ABSTRACT

A sampling device for the collection of fluids for examination thereof defines plural surface expanses respectively differing in capacity for sorption of the fluid whereby fluid incident on the member may be conducted to a selected one of the surface expanses adapted to conduct the fluid substantially unidirectionally therethrough. A fluid container is associated with the latter sampling device surface expanse and may include an indicator to detect the components of contained fluid. The sampling device may be used in combination with a diaper to perform urine analysis.

21 Claims, 6 Drawing Figures

FLUID SAMPLING DEVICE

FIELD OF THE INVENTION

This invention relates to fluid sampling and more particularly to sampling devices for collecting body fluids for analysis thereof.

BACKGROUND OF THE INVENTION

Urine analysis is a diagnostic tool employed by physicians for early detection of various symptoms of disorder or disease in patients. Diagnostic testing of urine in infants is difficult because of problems in obtaining urine specimens due to the fact that young subjects, for example, neonates and older non-toilet-trained infants, cannot produce specimens on demand.

Some urine sampling devices are available that can be fitted to such young subjects but their use generally requires the supervision of trained personnel as may be employed in a hospital to assure that the sampling procedure is carried out properly. Further, use of such devices is undesired because of discomfort to the young subject. Apart from the hospital situation, in medical examinations conducted at a physician's office, the examining physician frequently finds difficulty in obtaining urine specimens from young subjects. While urine samples can be taken at home, the examining physician has less than desired control over the sampling procedure than if such a specimen were obtained in his office or in a hospital.

SUMMARY OF THE INVENTION

It is an object of the present invention to provide improved fluid sampling devices providing controlled sampling without discomfort to young subjects and without need for supervision by specially trained personnel.

It is another object of the present invention to provide sampling devices providing sensible output indication of preselected components in the specimen collected.

It is a further object of the invention to provide a combined sampling device and diaper wherein urine specimens are collected without interfering substantially with urine sorption by the diaper.

In attaining the foregoing and other objects, the invention provides, in a first aspect thereof, a fluid sampling device including a valve member having a surface expanse for conducting a desired volume of fluid therethrough and thereby rendered substantially non-conducting to fluid and a sheet member having a surface expanse for disposition in the area of issuance of the fluid and continuous with the valve member surface expanse. The sheet member surface expanse conducts fluid therethrough to a lesser extent than the valve member surface expanse whereby fluid incident on the sheet member surface expanse is conducted to the valve member surface expanse. A container is associated with the valve member for collecting fluid conducted therethrough. In another aspect, the invention provides a diaper constructed so as to incorporate such sampling device therein. In a still further aspect the invention provides for arranging, operatively with the foregoing sampling device and diaper, or other arrangement incorporating such valve member, an indicator system integral therewith for detecting predetermined composition of collected fluid.

In such first-mentioned aspect, the invention contemplates the usage of such sampling device in combination with diapers of the type having a hydrophobic layer for engagement with an infant's skin and conducting fluid unidirectionally therethrough over the entire surface area thereof, for example, as shown in U.S. Pat. No. 3,180,335. In this usage, the sampling device of the invention may be applied to such uniformly hydrophobic layer to modify the fluid conducting characteristics for the collection of a specimen of desired volume.

In such third-mentioned aspect, the invention contemplates the use of known indicator systems, such as are disclosed in U.S. Pat. Nos. 3,164,534, 3,123,443, 3,122,420, 3,453,180, 3,438,737, 3,212,855, 3,012,976, 3,050,373, 2,981,606, 3,252,762, 3,290,117 and 3,092,463.

The foregoing and other objects and features of the invention will be evident from the following detailed description thereof and from the drawings wherein like reference numerals identify like parts throughout.

DESCRIPTION OF THE PREFERRED EMBODIMENTS

Figure 1:
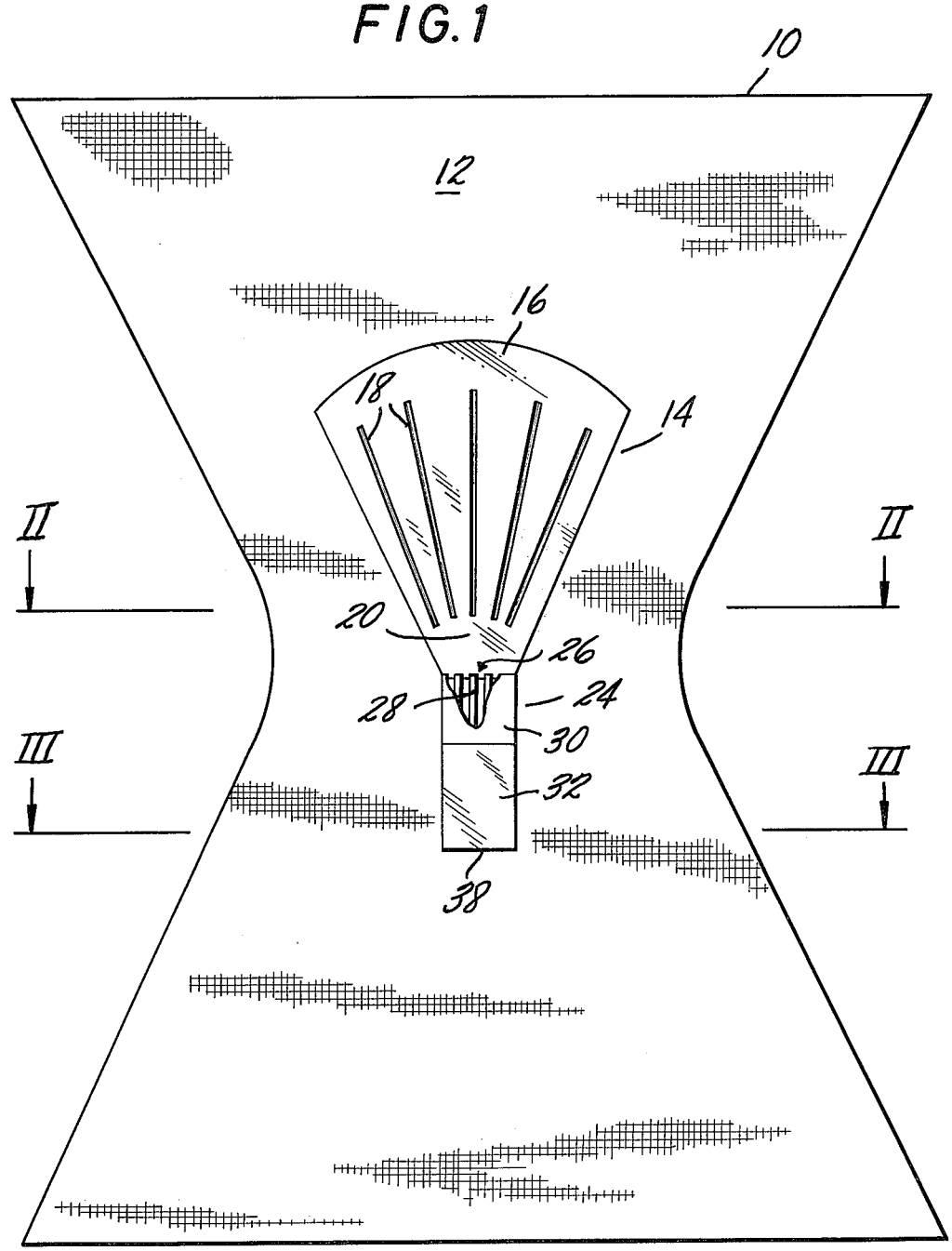
FIG. 1 is a plan view of a sampling device constructed in accordance with the invention and apparel embodying the same.

Referring to FIG. 1, diaper 10 defines a surface expanse 12 adapted to engage the skin of an infant and comprised of any textile, i.e., woven material, or nonwoven fabric known in the art including fibers or filaments formed into a textile or fabric by knitting, weaving, felting, needle punching, bonding or the like, the fabric being assembled so as to exhibit sorption capacity for liquid of desired amount. Disposed in common facing relation with diaper surface 12 is a sampling device 14 preferably constructed of thermoplastic materials known in the art such as polyolefins, e.g., polyethylene, polyvinylhalides, e.g., polyvinylchloride, cellulosics, e.g., cellulosic acetate, and copolymers thereof either with or without plasticizers and the art-known equivalents thereof. With the sampling device employed in a diaper, the thermoplastic material employed for the construction of the sampling device is preferably selected from a supple material to provide comfort when the device is in use. Polyethylene or plasticized polyvinylchloride or polyvinylchloride copolymers are especially suitable in this regard.

Sampling device 14 includes a sheet-like member having a surface expanse 16 arranged to be disposed in the area of issuance of the fluid to be sampled and preferably having channels 18 or the like formed therein for directing fluid incident thereon to area 20.

Figure 2:
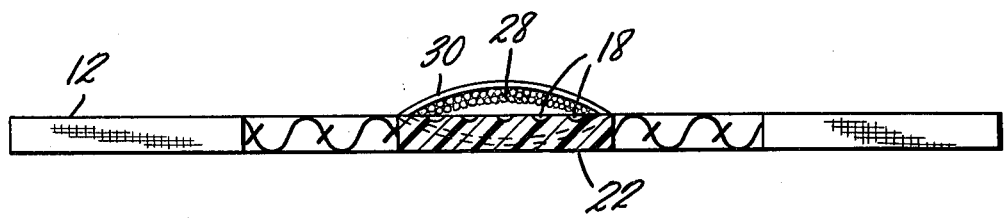
FIG. 2 is a sectional view of the FIG. 1 sampling device as seen from plane II—II of FIG. 1.

Referring to FIG. 2, channels 18 may comprise continuous indentations or impressions in the surface of sampling device 14. The thermoplastic material employed in constructing surface expanse 16 is selected such that expanse 16 conducts fluid therethrough, i.e., toward outer surface 22 of the diaper, to an extent less than conduction of fluid from surface 12 to surface 22 of the diaper. Otherwise stated, expanse 16 has less sorption capacity than does the fabric constituting the remainder of the diaper. Such relative decreased sorption capacity of expanse 16 may be attained by use of a relatively more hydrophobic surface coating therefor or by increasing the density of the material in expanse 16 such that the individual fibers thereof are in close association with one another and thereby provide less free volume in which fluid can collect.

Adjacent area 20 of expanse 16 thereof, sampling device 14 includes a valve-type member 24 broken away in part to show detail. Referring to FIGS. 1 and 2, surface expanse 26 of member 24 is continuous with surface expanse 16 and is defined by the ends of a plurality of fibers 28 disposed within casing 30. The fibers are comprised of a material which expands volumetrically upon wetting thereof by fluid. For this purpose, member 24 may comprise cellulosic fibers or polyethylene fibers admixed with cellulosic fibers which have a high fluid sorption capacity. When the fibers are dry, member 24 permits conduction of fluid from surface expanse 26 thereof interiorly of and through member 24. After passage of a given, e.g., predetermined, volume of fluid through member 24, fibers 28 are expanded volumetrically by sorption of fluid to substantially close the valve-type member, i.e., to render the same non-conducting to further fluid and thus oppose reverse conduction of fluid, i.e., from interiorly of member 24 onto surface expanse 26 thereof.

In its preferred form, member 24 is structured such that fibers 28 are disposed adjacent the interior periphery of casing 30 (FIG. 2), whereby surface expanse 26 encompasses the fiber ends and a generally central opening. Such opening is closed by volumetric expansion of the fibers.

Figure 3:
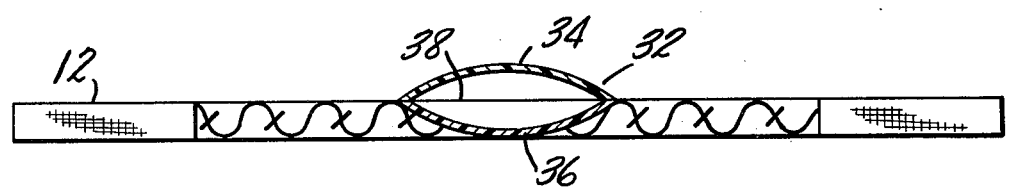
FIG. 3 is a sectional view of the FIG. 1 sampling device as seen from plane III—III of FIG. 1.

For purposes of containing fluid admitted interiorly of surface expanse 26, sampling device 14 includes a fluid impermeable container 32 constituted, for example, by a polyethylene sac. Container 32 may be manufactured by heat sealing opposed halfsections thereof 34 and 36 (FIG. 3) along end margin 38 and the side margins thereof. Casing 30 desirably is integral with container 32, comprising the neck portion of the container. Surface expanse 16 may include a lip portion seated in such neck portion atop half-section 36 and below fibers 28.

In operation of the structure described to this juncture, fluid incident on diaper surface 12 is absorbed thereby in customary manner. Fluid incident on surface expanse 16 of sampling device 14 is substantially unabsorbed thereby and is conducted in large part to surface expanse 26 whereupon it is conducted through such surface expanse and through member 24 into container 32 and therein retained upon substantial closure of member 24. The relative sizes of diaper surface expanse 12 available for fluid absorption and surface expanse 16 are selected with a view toward accommodating, on the one hand, desired fluid containment by diaper 10 and, on the other hand, desired fluid collection for analysis in container 32.

The fluid content of container 32 may be analyzed in place, as discussed below, or may be removed for laboratory analysis. In the latter situation, the container may be removably secured to the diaper and stripped therefrom. Analysis may then be conducted by introducing indicator systems into the container, e.g., by use of hypodermic apparatus. The invention also contemplates construction of the container with such as a pull-tab or the like, permitting ready removal of its fluid contents.

Container 32 may include therein material having sorption capacity in excess of the volumetric capacity of the container when empty and, desirably, sorption capacity from about two to about five times such container volumetric capacity. For this purpose, container 32 may incorporate therein cellulosic materials including bibulous materials such as paper, cotton or the like. In a particularly preferred embodiment, particulate cotton material 40 (FIG. 5) having a maximum transverse dimension or diameter of about 5 microns is disposed in container 32. When such particulate material is employed and includes an indicator system, the sampling device of the invention is preferably constructed as shown in FIGS. 4 to 6, wherein means are incorporated fore preventing movement of contaminated particulate material exteriorly of container 32.

Figure 5:
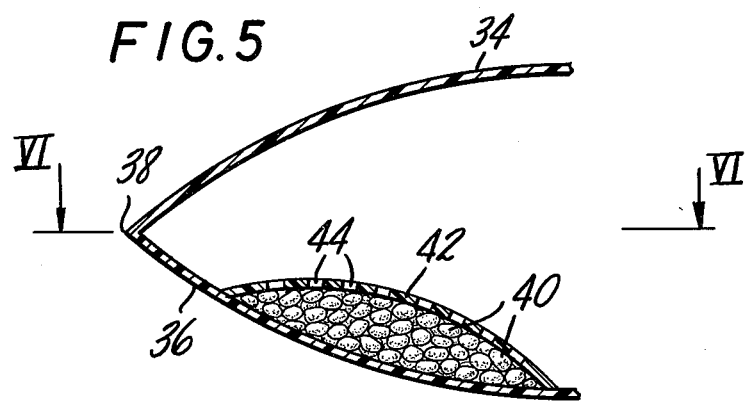
FIG. 5 is an enlarged sectional view of the fluid container of the FIG. 4 sampling device as seen from plane V—V of FIG. 4.
Figure 6:
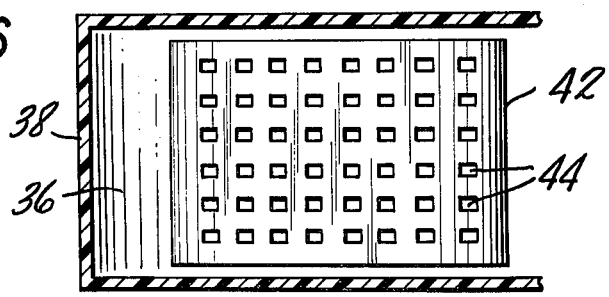
FIG. 6 is a further enlarged sectional view of the fluid container of the FIG. 4 sampling device as seen from plane VI—VI of FIG. 5.
Figure 4:
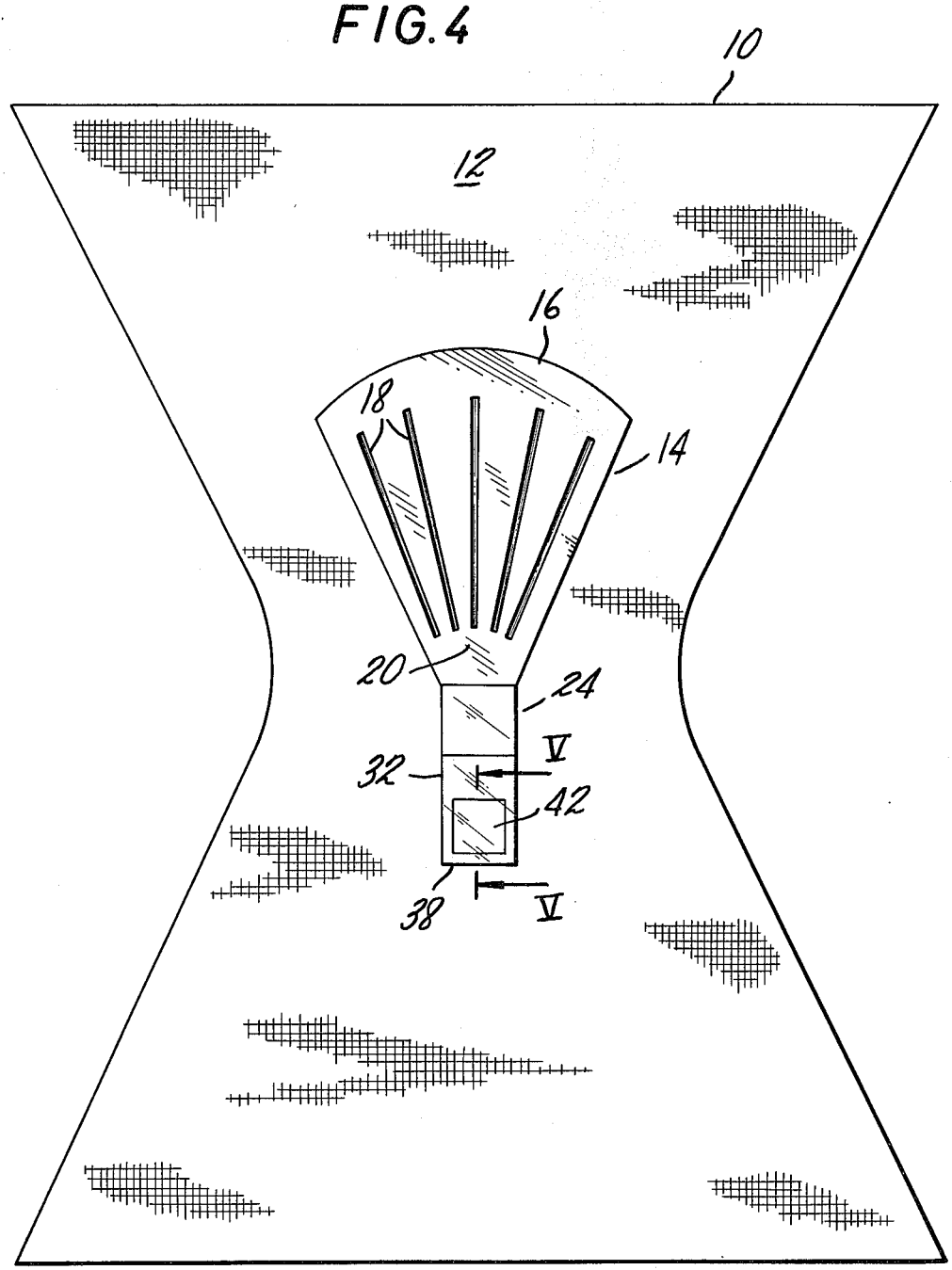
FIG. 4 is a plan view of another sampling device constructed in accordance with the invention and apparel embodying the same.

Referring to FIGS. 4 to 6, particulate material 40 is limited to disposition interiorly of container 32 by the provision of a mesh 42 or like structure situated interiorly of container 32 between material 40 and member 24. The mesh, which may be comprised of such as polyvinylhalide material, may be a suitably stamped sheet defining openings 44 (FIG. 6) therethrough of transverse dimension or diameter less than that of particulate material 40 but sufficient to allow passage of fluid therethrough.

In making sampling devices having integral means for preventing movement of contaminated particulate material, fresh particulate material may be disposed in a preselected sub-expanse of half-section 36 (FIG. 5). Then mesh 42 may be placed in overlying relation to the material and be heat-sealed at its margins to half-section 36. Finally, such half-section 36 may be heat-sealed at its margins to those of half-section 34.

In providing self-contained analysis of collected fluid and output indication of predetermined composition thereof, the particulate or other sorptive material in container 32 may be coated with standard urine analysis indicator systems, such as described in the foregoing referenced patents. Such systems may be selected to give a general indication of abnormality and the need for performing further tests or may be specific to identify an abnormal component of the urine, such as blood, or may comprise indicators used for PKU analyses and the like. The sorptive material in container 28 may also be divided into individual compartments with indicator systems for performing various urine analyses or also may be a strip of bibulous material containing several segments each of which has been individually treated with an indicator for identifying abnormal components of the urine.

In providing sampling-indicating devices in accordance with the invention, expanse 16 of sampling device 14 may be dispensed with and the sampling device reduced to the combination of valve-type member 24 and associated container 32.

As will be appreciated, sampling device 14 need not be constructed integrally with associated wearing apparel as illustrated in the drawings, but may comprise a separately manufactured assembly applied to the diaper surface disposed in wetting relationship to the subject, e.g., as by an adhesive backing or the like. In such application of sampling device constructed in accordance with the invention, the devices alter the fluid conducting characteristics of the diapers to facilitate collection of fluid in desired amount for analysis. By way of example, in diapers having a wettable surface comprised of a layer of hydrophobic material conducting fluid therethrough unidirectionally throughout the entire surface expanse thereof, as in above-referenced U.S. Pat. No. 3,180,335, sampling devices of the invention are applied to the surface of such layer and impede fluid collection over the surface expanse thereof coextensive with sampling device surface expanse 16, whereby fluid incident on such expanse 16 may be conducted in desired volume to member 24 for collection in container 32.

Sorption as used in the foregoing explanation as well as throughout the entire application is intended to include any reaction occurring on a surface, such as hydrolysis, electrification and especially absorption, adsorption, and persorption, i.e., permeation into a very porous solid as well as all phenomena related thereto and included in the definition thereof in *Hackh's Chemical Dictionary*, third edition (1953).

Various changes and modifications now made evident to those skilled in the art may be introduced in the foregoing preferred embodiments without departing from the scope of the invention. As respects mutual placement of the sampling device and the diaper, the illustrated arrangement is typical and may be varied. It is desirable to provide container 32 in such width that it may be conveniently situated between the buttocks of the subject to reduce sitting pressure thereon. While the sampling device is illustrated as being in sheet member form, other suitable configurations may be adopted therefor. Similarly, although the components of the sampling device in its preferred form are coplanar in disposition, it will be appreciated that only surface expanses 16 and 26 should be mutually continuous. Accordingly, the embodiments shown in the drawings and discussed in detail above are intended in an illustrative and not in a limiting sense. The true spirit and scope of the invention is defined in the following claims.

What is claimed is:

1. In combination with wearing apparel, for sampling body fluid issuing from a subject: means carried by said apparel for controlling the rate of flow of said body fluid including valve means having a surface expanse for conducting a predetermined volume of fluid therethrough at one rate and thereby rendered substantially non-conducting to fluid flow for another rate; sheet member means having a surface expanse for fluid disposition in an area of issuance of said body fluid and continuous with said valve means surface expanse, said sheet member means surface expanse including means for conducting fluid thereacross to a lesser extent than said valve means surface expanse, so that fluid incident on said sheet member means surface expanse is conducted to and through said valve means surface expanse; container means for containing fluid conducted through said valve means surface expanse; and means for fixedly supporting said valve means in fluid-issuing relation to said container means.

2. The invention claimed in claim 1 wherein said sheet member means surface expanse embodies means for directing fluid incident thereon to said valve means surface expanse.

3. The invention claimed in claim 1 wherein said valve means surface expanse has a lesser surface area than said sheet member means surface expanse.

4. The invention claimed in claim 1 wherein said valve means comprises a plurality of fibers, said valve means surface expanse being defined by ends of said fibers, said fibers being comprised of material volumetrically expandable upon wetting thereof by fluid.

5. The invention claimed in claim 4 wherein said container means further defines a casing for said fibers, said casing constituting said means for fixedly supporting said valve means in fluid-issuing relation to said container means.

6. The invention claimed in claim 4 wherein said valve means includes a hollow casing, said fibers being disposed adjacent the interior periphery of said casing, said fiber ends thereby defining a surface having a central opening, said opening being closeable upon such volumetric expansion of said fibers, said casing constituting said means for fixedly supporting said valve means in fluid-issuing relation to said container means.

7. The invention claimed in claim 1 wherein said container means includes indicator means providing sensible output indication of predetermined composition of fluid contained by said container means.

8. The apparatus claimed in claim 7 wherein said container means includes a plurality of elements each sorptive to said fluid and means for preventing movement of said sorptive elements exteriorly of said container means.

9. In combination, for sampling body fluid issuing from a subject: apparel means for wearing by said subject and having a surface expanse for conducting fluid therethrough; valve means in said apparel means having a surface expanse for conducting a predetermined volume of fluid therethrough and thereby rendered substantially non-conducting to fluid; sheet member means in said apparel means having a surface expanse continuous with said valve means surface expanse, said sheet member means surface expanse conducting fluid thereacross to a lesser extent than both said apparel means surface expanse and said valve means surface expanse, so that fluid incident on said sheet member means surface expanse is conducted to and through said valve means surface expanse; container means for containing fluid conducted through said valve means surface expanse; and means for fixedly supporting said valve means in fluid-issuing relation to said container means.

10. The invention claimed in claim 9 wherein said sheet member means surface expanse embodies means for directing fluid incident thereon to said valve means surface expanse.

11. The invention claimed in claim 9 wherein said valve means surface expanse has lesser surface area than said sheet member means surface expanse.

12. The invention claimed in claim 11 wherein said sheet member means surface expanse has lesser surface area than said apparel means surface expanse.

13. The invention claimed in claim 9 wherein said valve means comprises a plurality of fibers, said valve means surface expanse being defined by ends of said fibers, said fibers being comprised of material volumetrically expandable upon wetting thereof by fluid.

14. The invention claimed in claim 13 wherein said container, means further defines a casing for said fibers, said casing constituting said means for fixedly supporting said valve means in fluid-issuing relation to said container means.

15. The invention claimed in claim 13 wherein said valve means includes a hollow casing, said fibers being disposed adjacent the interior periphery of said casing, said fiber ends thereby defining a surface having a central opening, said opening being closeable upon such volumetric expansion of said fibers, said casing constituting said means for fixedly supporting said valve means in fluid-issuing relation to said container means.

16. The invention claimed in claim 9 wherein said container means includes indicator means providing sensible output indication of predetermined composition of fluid contained by said container means.

17. The invention claimed in claim 16 wherein said container means includes a plurality of elements each sorptive to said fluid and means for preventing movement of said sorptive elements exteriorly of said container means.

18. In combination with wearing appparel, for sampling body fluid issuing from a subject and providing output indication of preselected composition of fluid thereby sampled: valve means supported thereon and having a surface expanse for disposition in an area of issuance of said fluid and for conducting a predetermined volume of fluid thereacross and thereby rendered substantially non-conducting to fluid; container means for containing fluid conducted through said valve means surface expanse; means for fixedly supporting said valve means in fluid-issuing relation to said container means; and indicator means in said container means for providing sensible output indication of said preselected fluid composition.

19. The invention claimed in claim 18 wherein said valve means comprises a plurality of fibers, said valve means surface expanse being defined by ends of said fibers, said fibers being comprised of material volumetrically expandable upon wetting thereof by fluid.

20. The invention claimed in claim 19 wherein said container means further defines a casing for said fibers, said casing constituting said means for fixedly supporting said valve means in fluid-issuing relation to said container means.

21. The invention claimed in claim 19 wherein said valve means includes a hollow casing, said fibers being disposed adjacent the interior periphery of said casing, said fiber ends thereby defining a surface having a central opening, said opening being closeable upon such volumetric expansion of said fibers, said casing constituting said means for fixedly supporting said valve means in fluid-issuing relation to said container means.

* * * * *